(12) United States Patent
Kim et al.

(10) Patent No.: US 9,809,104 B2
(45) Date of Patent: Nov. 7, 2017

(54) TRANSMISSION SYSTEM OF HYBRID ELECTRIC VEHICLE

(71) Applicant: Hyundai Motor Company, Seoul (KR)

(72) Inventors: Baekyu Kim, Suwon-si (KR);
Samgyun Kim, Hwaseong-si (KR);
Seokjoon Kim, Yongin-si (KR);
Seungwoo Ha, Suwon-si (KR);
Jaeyoung Jeun, Yongin-si (KR);
Chulmin Ahn, Busan (KR); Jaemoon Lee, Suwon-si (KR); Sunggon Byun, Anyang-si (KR); Jongpil Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 470 days.

(21) Appl. No.: 14/521,279

(22) Filed: Oct. 22, 2014

(65) Prior Publication Data

US 2015/0167808 A1 Jun. 18, 2015

(30) Foreign Application Priority Data

Dec. 17, 2013 (KR) ........................ 10-2013-0157667

(51) Int. Cl.
*B60K 6/383* (2007.10)
*B60K 6/365* (2007.10)
(Continued)

(52) U.S. Cl.
CPC .............. *B60K 6/383* (2013.01); *B60K 6/365* (2013.01); *B60K 6/387* (2013.01); *B60K 6/445* (2013.01);
(Continued)

(58) Field of Classification Search
CPC ...................................................... B60K 6/383
See application file for complete search history.

(56) References Cited

U.S. PATENT DOCUMENTS 5,823,281 A 10/1998 Yamaguchi et al.
6,695,736 B2 2/2004 Takenaka
(Continued)

FOREIGN PATENT DOCUMENTS

JP 48-049115 A 7/1973
JP 50-030223 A 3/1975

*Primary Examiner* — Derek D Knight
(74) *Attorney, Agent, or Firm* — Morgan Lewis & Bockius LLP

(57) ABSTRACT

A transmission system of a hybrid electric vehicle may include an input shaft connected to an engine, a planetary gear set including a first rotation element operated as an output element, a second rotation element connected to the input shaft and operated as an input element, and a third rotation element operated as another output element, a first motor operably connected to the first rotation element, and selectively connected to a transmission housing, a first motor/generator configured to generate electric energy by receiving torque through the first motor shaft, a second motor shaft being a hollow shaft, disposed at a radial exterior of the first motor shaft without rotational interference with the first motor shaft, and operably connected to the third rotation element so as to receive torque of the engine, and a second motor/generator disposed on the second motor shaft and outputting torque through the second motor shaft.

17 Claims, 6 Drawing Sheets

(51) Int. Cl.
*B60K 6/387* (2007.10)
*B60K 6/445* (2007.10)
*F16H 3/72* (2006.01)
*B60K 6/38* (2007.10)

(52) U.S. Cl.
CPC ........ *F16H 3/727* (2013.01); *B60K 2006/381* (2013.01); *F16H 2200/2005* (2013.01); *F16H 2200/2066* (2013.01); *F16H 2200/2082* (2013.01); *Y02T 10/6239* (2013.01); *Y10S 903/919* (2013.01)

(56) References Cited

U.S. PATENT DOCUMENTS

| | | |
|---|---|---|
| 7,189,177 B2 | 3/2007 | Takasu et al. |
| 7,822,524 B2 | 10/2010 | Tabata et al. |
| 8,430,190 B2 | 4/2013 | Honda et al. |
| 9,180,875 B2 * | 11/2015 | Choi ..................... B60K 6/365 |
| 2002/0094898 A1 | 7/2002 | Hata et al. |
| 2002/0112901 A1 | 8/2002 | Yamaguchi et al. |
| 2004/0166980 A1 | 8/2004 | Supina |
| 2009/0082151 A1 | 3/2009 | Tabata |
| 2012/0065015 A1 | 3/2012 | Tamai |
| 2015/0148171 A1 | 5/2015 | Kim |
| 2015/0167808 A1 | 6/2015 | Kim |

* cited by examiner

FIG. 2

| mode | OWC | BK | CL second embodiment | description |
|------|-----|-----|-----|-----|
| EV   | ●   |    |     | achieving EV mode(MG2) |
| HEV1 |     |    |     | achieving power split mode |
| HEV2 |     | ●  |     | achieving high-speed fixed gear ratio mode(OD) |
| HEV3 |     |    | ●   | achieving high-speed fixed gear ratio mode(1:1) |

# TRANSMISSION SYSTEM OF HYBRID ELECTRIC VEHICLE

CROSS-REFERENCE TO RELATED APPLICATION

The present application claims priority to Korean Patent Application No. 10-2013-0157667 filed Dec. 17, 2013, the entire contents of which is incorporated herein for all purposes by this reference.

BACKGROUND OF THE INVENTION

Field of the Invention

The present invention relates to a transmission system of a hybrid electric vehicle. More particularly, the present invention relates to a transmission system of a hybrid electric vehicle which can achieve electric vehicle (EV) mode, power split mode, and overdrive (OD) mode.

Description of Related Art

Generally, a hybrid vehicle is a vehicle which uses two different power sources efficiently.

Such a hybrid electric vehicle typically uses an engine and a motor/generator. The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as a clutch and a brake for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depending on connections of the planetary gear sets, the motor/generators, and the torque delivery apparatus.

In addition, the power transmission system of the multi-mode type has different features such a durability, power delivery efficiency, and size depending on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission system of a hybrid electric vehicle having advantages of achieving EV mode, power split mode, and OD mode according to operation of a brake and a rotation restricting member by combining two motor/generators, the brake, and the rotation restricting member.

Various aspects of the present invention are directed to providing a transmission system of a hybrid electric vehicle that enhances fuel economy by not supplying hydraulic pressure to a brake at power split mode that is used when driving on a city road.

Various aspects of the present invention are additionally directed to providing a transmission system of a hybrid electric vehicle that may reduce mechanical power loss and capacity of a motor/generator and may improve fuel economy by achieving OD mode using a planetary gear set.

Various aspects of the present invention provides are further directed to providing a transmission system of a hybrid electric vehicle that may reduce capacity of motor/generator and a length of the transmission by increasing rotation speed of an input shaft using a planetary gear set on the input shaft and supplying the increased rotation speed to a motor/generator.

According to various aspects of the present invention, a transmission system of a hybrid electric vehicle may include an input shaft connected to an engine, a planetary gear set including a first rotation element operated as an output element, a second rotation element connected to the input shaft and operated as an input element, and a third rotation element operated as another output element, a first motor shaft disposed in parallel with and apart from the input shaft, operably connected to the first rotation element, and selectively connected to a transmission housing, a first motor/generator disposed on the first motor shaft and configured to generate electric energy by receiving torque through the first motor shaft, a second motor shaft being a hollow shaft, disposed at a radial exterior of the first motor shaft without rotational interference with the first motor shaft, and operably connected to the third rotation element so as to receive torque of the engine, and a second motor/generator disposed on the second motor shaft and outputting torque through the second motor shaft.

The transmission system may further include a rotation restricting member disposed between the second rotation element of the planetary gear set and the transmission housing and preventing inverse rotation of the second rotation element.

The planetary gear set may be a single pinion planetary gear set, wherein the first rotation element is a sun gear, the second rotation element is a planet carrier, and the third rotation element is a ring gear.

The transmission system may further include a first intermediate output gear directly connected to the first rotation element, a second intermediate output gear directly connected to the third rotation element; a first motor shaft gear engaged with the first intermediate output gear and fixedly disposed on the first motor shaft, and a second motor shaft gear engaged with the second intermediate output gear and fixedly disposed on the second motor shaft.

The transmission system may further include a speed reduction device configured to transmit torque of the second motor shaft gear to a differential apparatus.

The speed reduction device may include an output shaft disposed in parallel with the input shaft, an output shaft input gear fixedly disposed on one end portion of the output shaft and engaged with the second motor shaft gear, and an output shaft output gear fixedly disposed on another end portion of the output shaft and configured to transmit torque to the differential apparatus.

The transmission system may further include a brake disposed between the first motor shaft and the transmission housing.

The rotation restricting member may be a one-way clutch, two-way clutch or a brake.

The transmission system may further include a clutch configured to direct-couple the planetary gear set.

According to various aspects of the present invention, a transmission system of a hybrid electric vehicle may include an input shaft connected to an engine, a planetary gear set including a first rotation element operated as an output element, a second rotation element connected to the input shaft and operated as an input element, and a third rotation element operated as another output element, a first motor shaft disposed in parallel with and apart from the input shaft, operably connected to the first rotation element, and selectively connected to a transmission housing, a first motor/generator disposed on the first motor shaft and configured to generate electric energy by receiving torque through the first motor shaft, a second motor shaft being a hollow shaft, disposed at a radial exterior of the first motor shaft without rotational interference with the first motor shaft, and operably connected to the third rotation element so as to receive torque of the engine, a second motor/generator disposed on the second motor shaft and outputting torque through the second motor shaft, and a speed reduction device configured to transmit torque of the second motor shaft gear to a differential apparatus.

The transmission system may further include a rotation restricting member disposed between the second rotation element of the planetary gear set and the transmission housing and preventing inverse rotation of the second rotation element.

The planetary gear set may be a single pinion planetary gear set, wherein the first rotation element is a sun gear, the second rotation element is a planet carrier, and the third rotation element is a ring gear.

The transmission system may further include a first intermediate output gear directly connected to the first rotation element, a second intermediate output gear directly connected to the third rotation element, a first motor shaft gear engaged with the first intermediate output gear and fixedly disposed on the first motor shaft, and a second motor shaft gear engaged with the second intermediate output gear and fixedly disposed on the second motor shaft.

The speed reduction device may include: an output shaft disposed in parallel with the input shaft, an output shaft input gear fixedly disposed on one end portion of the output shaft and engaged with the second motor shaft gear, and an output shaft output gear fixedly disposed on another end portion of the output shaft and configured to transmit torque to the differential apparatus.

The transmission system may further include a brake disposed between the first motor shaft and the transmission housing.

The transmission system may further include a clutch configured to direct-couple the planetary gear set.

The rotation restricting member may be a one-way clutch, two-way clutch or a brake.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of the exemplary transmission system of the hybrid electric vehicle at each mode according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
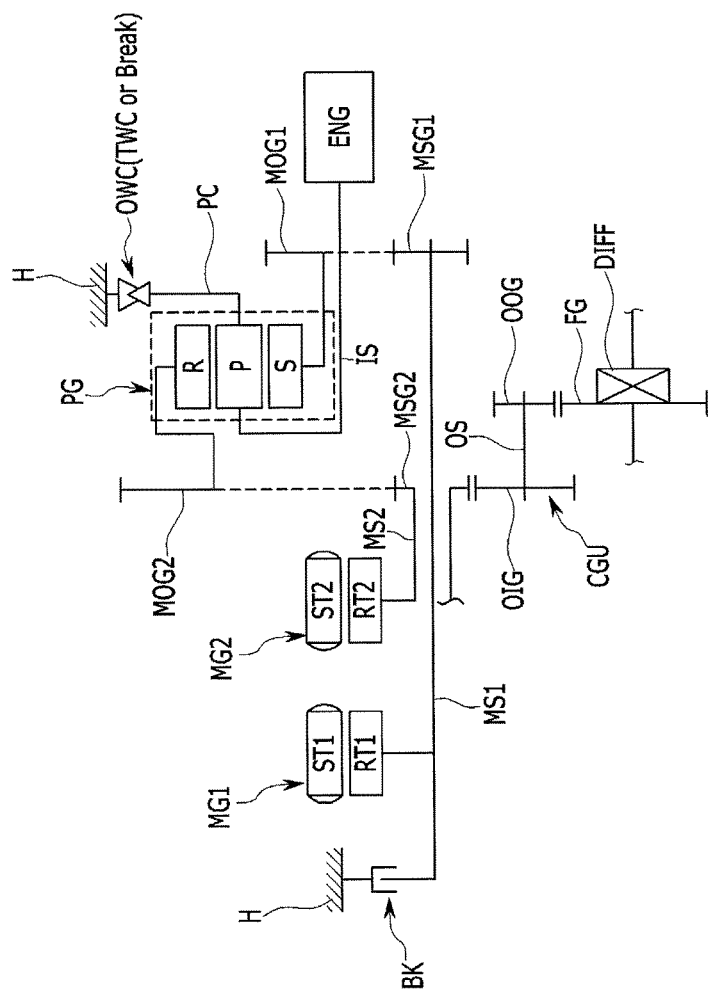
FIG. 1 is a schematic diagram of an exemplary transmission system of a hybrid electric vehicle according to various embodiments of the present invention.

FIG. 1 is a schematic diagram of a transmission system of a hybrid electric vehicle according to various embodiments of the present invention.

Referring to FIG. 1, a transmission system of a hybrid electric vehicle according to various embodiments of the present invention includes an input shaft IS, a planetary gear set PG, first and second motor/generators MG1 and MG2, a brake BK, a one-way clutch OWC that is a rotation restricting member, and a speed reduction device CGU.

The input shaft IS is connected to an output side of an engine ENG and receives torque of the engine ENG.

The planetary gear set PG is disposed on the input shaft IS and is a single pinion planetary gear set. The planetary gear set PG includes a sun gear S, a planet carrier PC rotatably supporting a pinion P externally meshed with the sun gear S, and a ring gear R internally meshed with the pinion P as rotation elements thereof.

The sun gear S is an output element and is directly connected to a first intermediate output gear MOG1, the planet carrier PC is directly connected to the input shaft IS and is connected to a transmission housing H through the one-way clutch OWC, and the ring gear R is an output element and is directly connected to a second intermediate output gear MOG2.

The first intermediate output gear MOG1 is disposed at a side of the planetary gear set PG and the second intermediate output gear MOG2 is disposed at the other side of the planetary gear set PG.

Each of the first and second motor/generators MG1 and MG2 is operated as a motor or a generator, and are disposed apart from the input shaft IS.

The first motor/generator MG1 is used to generate electric energy and includes a first stator ST1 fixed to the transmission housing H and a first rotor R1 rotatable in the first stator ST1.

The first rotor RT1 is directly connected to a first motor shaft MS1 disposed in parallel with the input shaft IS. One end of the first motor shaft MS1 is provided with a first motor shaft gear MSG1 fixedly disposed thereon and engaged with the first intermediate output gear MOG1, and the other end thereof is connected to the transmission housing H by interposing the brake BK therebetween. The brake BK is disposed close to a rear cover of the transmission housing H.

The second motor/generator MG2 is used to supply driving torque, and includes a second stator ST2 fixed to the transmission housing H and a second rotor R2 rotatable in the second stator ST2.

The second rotor RT2 is directly connected to the second motor shaft MS2 disposed in parallel with the input shaft IS. The second motor shaft MS2 is a hollow shaft and is disposed at a radial exterior of the first motor shaft MS1 without rotational interference with the first motor shaft MS1. A second motor shaft gear MSG2 is fixedly disposed on one end of the second motor shaft MS2 and is engaged with the second intermediate output gear MOG2.

Herein, the second motor/generator MG2 is disposed on a middle portion of the first motor shaft MS1 and the first motor/generator MG2 is disposed on the other end portion of the first motor shaft MS1.

The speed reduction device CGU includes an output shaft OS disposed in parallel with the input shaft IS and the first and second motor shafts MS1 and MS2, and an output shaft input gear OIG and an output shaft output gear OOG fixedly disposed respectively on both end portions of the output shaft OS.

The output shaft input gear OIG is engaged with the second motor shaft gear MSG2 and the output shaft output gear OOG is engaged with a final reduction gear FG of a differential apparatus DIFF.

The brake BK may be a conventional multi-plate friction element of wet type, and the rotation restricting member may be the one-way clutch OWC but is not limited thereto. A two-way clutch or a brake may be used as the rotation restricting member.

FIG. 2 is an operational chart of a transmission system of a hybrid electric vehicle according to various embodiments of the present invention at each mode.

Referring to FIG. 2, the transmission system of a hybrid electric vehicle according to various embodiments of the present invention can achieve electric vehicle (EV) mode, power split mode, and overdrive (OD) mode.

The one-way clutch OWC is operated at the EV mode, the brake BK is operated at the OD mode, and neither of the one-way clutch OWC and the brake (BK) is operated at the power split mode that is frequently used when the vehicle drives on the city road.

Figure 3:
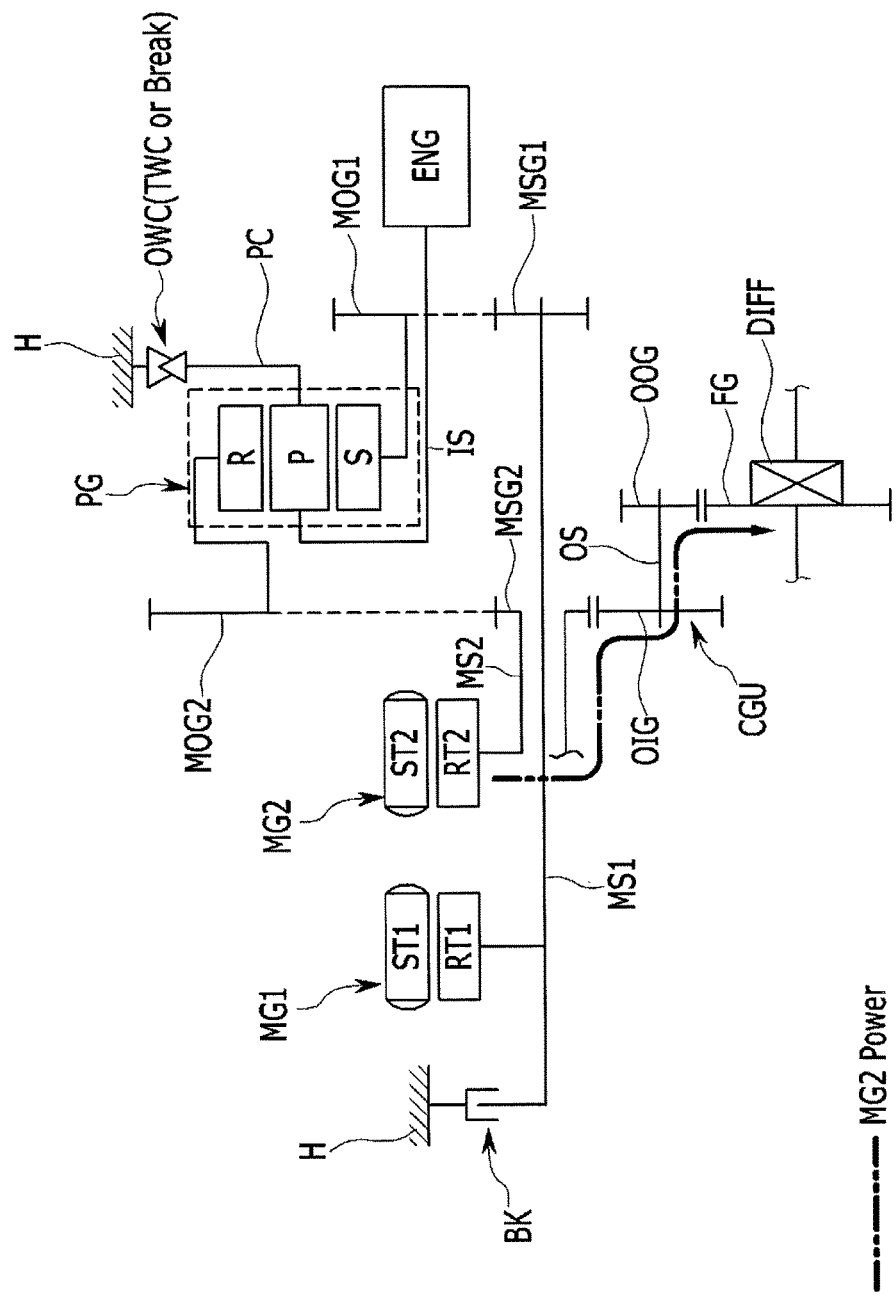
FIG. 3 is a schematic diagram for illustrating power flow in the exemplary transmission system of the hybrid electric vehicle at electric vehicle (EV) mode according to the present invention.
Figure 4:
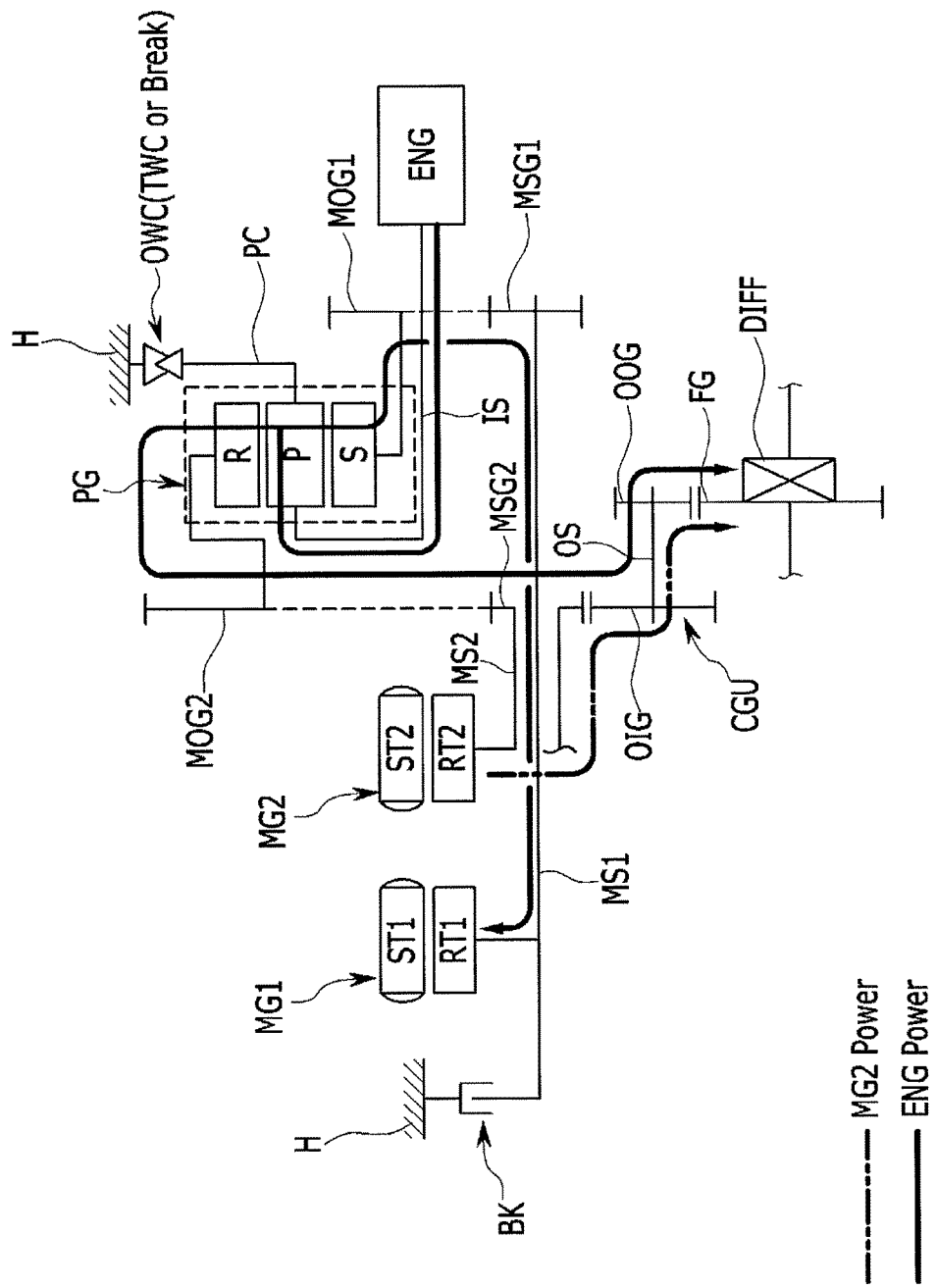
FIG. 4 is a schematic diagram for illustrating power flow in the exemplary transmission system of the hybrid electric vehicle at power split mode according to the present invention.
Figure 5:
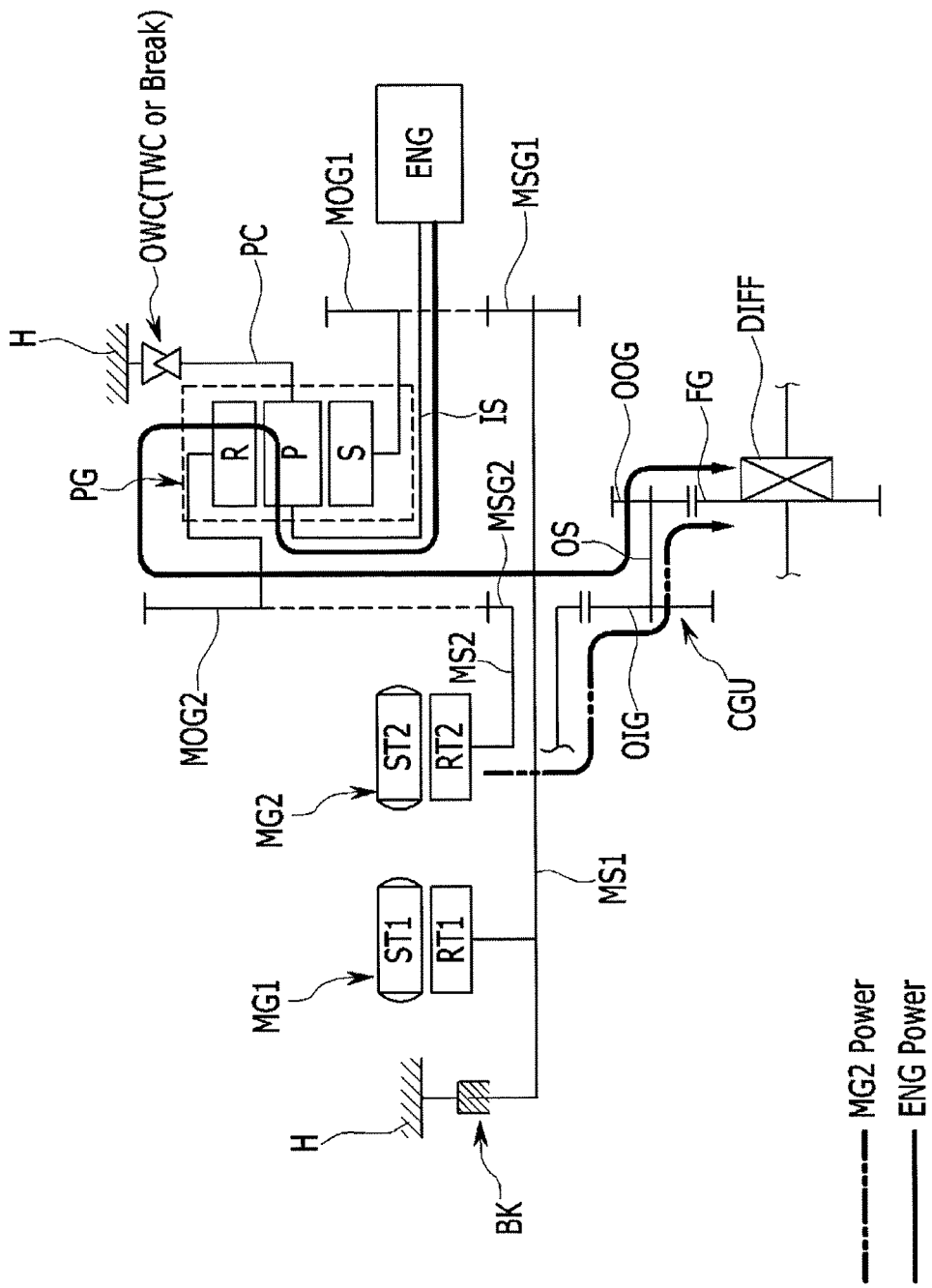
FIG. 5 is a schematic diagram for illustrating power flow in the exemplary transmission system of the hybrid electric vehicle at OD mode according to the present invention.

Referring to FIG. 3 to FIG. 5, power flow at each mode in the transmission system of a hybrid electric vehicle according to various embodiments of the present invention will hereinafter be described in detail.

FIG. 3 is a schematic diagram for illustrating power flow in a transmission system of a hybrid electric vehicle according to various embodiments of the present invention at electric vehicle (EV) mode.

Referring to FIG. 3, rotation of the input shaft IS is restricted by operation of the one-way clutch OWC and the engine ENG is maintained in a stopped state at the EV mode.

At this state, the second motor/generator MG2 is operated and the torque of the second motor/generator MG2 is transmitted to the final reduction gear FG of the differential apparatus DIFF through the second motor shaft MS2, the second motor shaft gear MSG2, the output shaft input gear OIG, the output shaft OS, and the output shaft output gear OOG.

FIG. 4 is a schematic diagram for illustrating power flow in a transmission system of a hybrid electric vehicle according to various embodiments of the present invention at power split mode.

Referring to FIG. 4, the power split mode is frequently used when the vehicle drives on the city road, and the brake BK and the one-way clutch OWC are not operated at the power split mode.

The engine ENG and the second motor/generator MG2 are operated and the torques of the engine ENG and the second motor/generator MG2 are transmitted to the final reduction gear FG of the differential apparatus DIFF at the power split mode.

That is, the torque of the engine ENG is input to the planet carrier PC of the planetary gear set PG through the input shaft IS, is transmitted to the second intermediate output gear MOG2 as main power through the ring gear R, and is transmitted to the first intermediate output gear MOG1 through the sun gear S.

The torque transmitted to the second intermediate output gear MOG2 is added with the torque of the second motor/generator MG2 at the second motor shaft gear MSG2, and the added torque is transmitted to the final reduction gear FG of the differential apparatus DIFF through the output shaft input gear OIG, the output shaft OS, and the output shaft output gear OOG.

The torque transmitted to the first intermediate output gear MOG1 is transmitted to the first rotor RT1 through the first motor shaft gear MSG1 and the first motor shaft MS1 and causes the first motor/generator MG1 to generate electric energy. The electrical energy generated by the first motor/generator MG1 is used to charge the battery or is supplied to the second motor/generator MG2.

FIG. 5 is a schematic diagram for illustrating power flow in the transmission system of the hybrid electric vehicle according to the first exemplary embodiment of the present invention at OD mode.

Referring to FIG. 5, the brake BK is operated at the OD mode.

The torque of the engine ENG is used as main power and the torque of the second motor/generator MG2 is used as an auxiliary power at the OD mode.

That is, if the torque of the engine ENG is input to the planet carrier PC of the planetary gear set PG through the input shaft IS, the sun gear S is operated as a fixed element by operation of the brake BK. Therefore, the torque with increased rotation speed is output through the ring gear R. The torque with increased rotation speed is transmitted to the second motor shaft gear MSG2 through the second intermediate output gear MOG2 and is added with the torque of the second motor/generator MG2 at the second motor shaft gear MSG2. Therefore, the added torque is transmitted to the final reduction gear FG of the differential apparatus DIFF through the output shaft input gear OIG, the output shaft OS, and the output shaft output gear OOG.

The transmission system of a hybrid electric vehicle according to various embodiments of the present invention can achieve the EV mode, the power split mode, and the OD mode by combining two motor/generators MG1 and MG2, the brake BK, and the one-way clutch OWC.

Since the hydraulic pressure is not supplied to the brake BK at the power split mode that is frequently used when the vehicle runs on the city road, fuel economy may be improved.

Since the OD mode is achieved by using the planetary gear set PG, fuel economy may be improved and capacity of the first motor/generator MG1 may be reduced.

Since the OD mode is achieved by using the planetary gear set PG, an output gear set for achieving the OD mode may be removed and a length of the transmission may be shortened.

Figure 6:
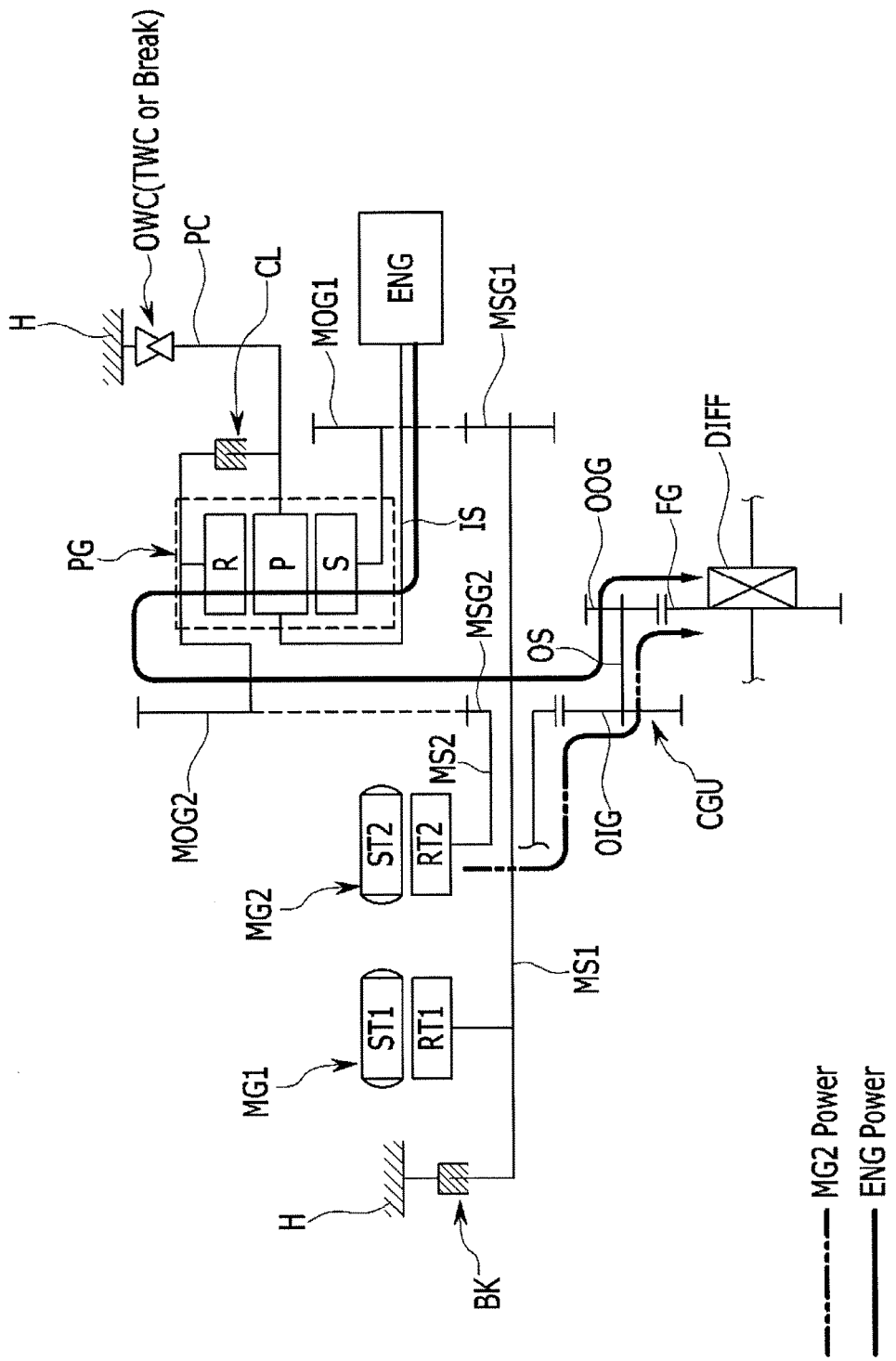
FIG. 6 is a schematic diagram for illustrating power flow in the transmission system of the hybrid electric vehicle at engine direct-couple mode according to the present invention.

FIG. 6 is a schematic diagram for illustrating power flow in the transmission system of the hybrid electric vehicle according to various embodiments of the present invention at engine direct-couple mode.

Referring to FIG. 6, various embodiments of the present invention further include a clutch CL for direct-coupling the planetary gear set PG.

That is, the clutch CL connects two rotation elements among three rotation elements of the planetary gear set PG and direct-couples the planetary gear set PG. The clutch CL is disposed between the planet carrier PC and the ring gear R.

If the clutch CL is operated, the planetary gear set PG becomes direct-coupling state and the engine direct-couple mode may be achieved.

The transmission system of a hybrid electric vehicle according to various embodiments of the present invention can achieve the EV mode, the power split mode, and the OD mode by combining two motor/generators, the brake, and the rotation restricting member.

Since the hydraulic pressure is not supplied to the brake at the power split mode that is frequently used when the vehicle runs on the city road, fuel economy may be improved.

Since the OD mode is achieved, fuel economy may be improved by reducing mechanical power loss and capacity of the first motor/generator may be reduced.

Since the rotation speed of the input shaft is increased by the planetary gear set on the input shaft and is then supplied to the motor/generator, the capacity of the motor/generator may be reduced and the length of the transmission may be shortened.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system of a hybrid electric vehicle comprising:
    an input shaft connected to an engine;
    a planetary gear set including a first rotation element operated as an output element, a second rotation element connected to the input shaft and operated as an input element, and a third rotation element operated as another output element;
    a first motor shaft disposed in parallel with and apart from the input shaft, operably connected to the first rotation element, and selectively connected to a transmission housing;
    a first motor/generator disposed on the first motor shaft and configured to generate electric energy by receiving torque through the first motor shaft;
    a second motor shaft being a hollow shaft, disposed at a radial exterior of the first motor shaft without rotational interference with the first motor shaft, and operably connected to the third rotation element so as to receive torque of the engine;
    a second motor/generator disposed on the second motor shaft and outputting torque through the second motor shaft; and
    a rotation restricting member disposed between the second rotation element of the planetary gear set and the transmission housing and preventing inverse rotation of the second rotation element.

2. The transmission system of claim 1, wherein the planetary gear set is a single pinion planetary gear set, wherein the first rotation element is a sun gear, the second rotation element is a planet carrier, and the third rotation element is a ring gear.

3. The transmission system of claim 1, further comprising:
- a first intermediate output gear directly connected to the first rotation element;
- a second intermediate output gear directly connected to the third rotation element;
- a first motor shaft gear engaged with the first intermediate output gear and fixedly disposed on the first motor shaft; and
- a second motor shaft gear engaged with the second intermediate output gear and fixedly disposed on the second motor shaft.

4. The transmission system of claim 3, further comprising a speed reduction device configured to transmit torque of the second motor shaft gear to a differential apparatus.

5. The transmission system of claim 4, wherein the speed reduction device comprises:
- an output shaft disposed in parallel with the input shaft;
- an output shaft input gear fixedly disposed on one end portion of the output shaft and engaged with the second motor shaft gear; and
- an output shaft output gear fixedly disposed on another end portion of the output shaft and configured to transmit torque to the differential apparatus.

6. The transmission system of claim 1, further comprising a brake disposed between the first motor shaft and the transmission housing.

7. The transmission system of claim 1, wherein the rotation restricting member is a one-way clutch, two-way clutch or a brake.

8. The transmission system of claim 1, further comprising a clutch configured to direct-couple the planetary gear set.

9. The transmission system of claim 6, wherein the brake is disposed close to a rear cover of the transmission housing.

10. A transmission system of a hybrid electric vehicle comprising:
- an input shaft connected to an engine;
- a planetary gear set including a first rotation element operated as an output element, a second rotation element connected to the input shaft and operated as an input element, and a third rotation element operated as another output element;
- a first motor shaft disposed in parallel with and apart from the input shaft, operably connected to the first rotation element, and selectively connected to a transmission housing;
- a first motor/generator disposed on the first motor shaft and configured to generate electric energy by receiving torque through the first motor shaft;
- a second motor shaft being a hollow shaft, disposed at a radial exterior of the first motor shaft without rotational interference with the first motor shaft, and operably connected to the third rotation element so as to receive torque of the engine;
- a second motor/generator disposed on the second motor shaft and outputting torque through the second motor shaft;
- a speed reduction device configured to transmit torque of the second motor shaft gear to a differential apparatus; and
- a rotation restricting member disposed between the second rotation element of the planetary gear set and the transmission housing and preventing inverse rotation of the second rotation element.

11. The transmission system of claim 10, wherein the planetary gear set is a single pinion planetary gear set, wherein the first rotation element is a sun gear, the second rotation element is a planet carrier, and the third rotation element is a ring gear.

12. The transmission system of claim 10, further comprising:
- a first intermediate output gear directly connected to the first rotation element;
- a second intermediate output gear directly connected to the third rotation element;
- a first motor shaft gear engaged with the first intermediate output gear and fixedly disposed on the first motor shaft; and
- a second motor shaft gear engaged with the second intermediate output gear and fixedly disposed on the second motor shaft.

13. The transmission system of claim 10, wherein the speed reduction device comprises:
- an output shaft disposed in parallel with the input shaft;
- an output shaft input gear fixedly disposed on one end portion of the output shaft and engaged with the second motor shaft gear; and
- an output shaft output gear fixedly disposed on another end portion of the output shaft and configured to transmit torque to the differential apparatus.

14. The transmission system of claim 10, further comprising a brake disposed between the first motor shaft and the transmission housing.

15. The transmission system of claim 10, further comprising a clutch configured to direct-couple the planetary gear set.

16. The transmission system of claim 10, wherein the rotation restricting member is a one-way clutch, two-way clutch or a brake.

17. The transmission system of claim 14, wherein the brake is disposed close to a rear cover of the transmission housing.

* * * * *